United States Patent
Carver et al.

(10) Patent No.: US 11,942,879 B2
(45) Date of Patent: *Mar. 26, 2024

(54) COOLING MODULE USING ELECTRICAL PULSES

(71) Applicant: Calagen, Inc., Portland, OR (US)

(72) Inventors: David Reginald Carver, Baton Rouge, LA (US); Sean William Reynolds, Baton Rouge, LA (US); Sean Claudius Hall, Baton Rouge, LA (US)

(73) Assignee: Calagen, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,495

(22) Filed: Apr. 17, 2023

(65) Prior Publication Data

US 2023/0318491 A1 Oct. 5, 2023

Related U.S. Application Data

(63) Continuation-in-part of application No. 17/697,808, filed on Mar. 17, 2022, now Pat. No. 11,671,033, which is a continuation of application No. 17/238,643, filed on Apr. 23, 2021, now Pat. No. 11,303,229, which is a continuation-in-part of application No. 17/175,248, filed on Feb. 12, 2021, now Pat. No. 11,223,301, which is a continuation of application No. 16/997,557, filed on Aug. 19, 2020, now Pat. No. 10,951,136.

(60) Provisional application No. 63/015,319, filed on Apr. 24, 2020, provisional application No. 62/889,506, filed on Aug. 20, 2019.

(51) Int. Cl.
*H02N 3/00* (2006.01)
*F25B 21/02* (2006.01)
*H01L 35/30* (2006.01)

(52) U.S. Cl.
CPC ..................... *H02N 3/00* (2013.01)

(58) Field of Classification Search
CPC ........ H02N 3/00; H02N 11/002; H01L 35/00; H01L 35/28; H01L 35/30; H02J 50/10; H02M 3/00; H02M 11/00; H03B 5/08; H03B 5/00; F25B 21/00; F25B 21/02
See application file for complete search history.

(56) References Cited

U.S. PATENT DOCUMENTS 3,170,130 A * 2/1965 Begley .................. H10N 10/00
174/15.1
3,343,009 A * 9/1967 Wagini ................. H02N 11/002
310/11

(Continued)

FOREIGN PATENT DOCUMENTS

JP 2002-272143 A 9/2002
JP 2008-226490 A 9/2008

(Continued)

*Primary Examiner* — Edgardo San Martin
(74) *Attorney, Agent, or Firm* — Klarquist Sparkman, LLP

(57) ABSTRACT

A circuit for cooling is disclosed. The circuit uses a pulse generator in combination with a conductor. A cooling effect of the circuit on the conductor can be used and can be used in conjunction with a Carnot or Stirling engine. A resultant energy applied to a load is larger than the energy supplied by the pulse generator due to the absorption of external energy by the conductor.

17 Claims, 14 Drawing Sheets

(56) References Cited

U.S. PATENT DOCUMENTS

| | | | | |
|---|---|---|---|---|
| 3,355,605 A * | 11/1967 | Okress | H02K 44/08 | 310/11 |
| 3,452,225 A * | 6/1969 | Gourdine | H02N 3/00 | 310/11 |
| 3,487,334 A * | 12/1969 | Eastman | H03B 9/143 | 331/107 DP |
| 4,000,482 A * | 12/1976 | Staub | H01F 27/322 | 336/60 |
| 4,016,438 A * | 4/1977 | Holt | H02K 44/08 | 310/11 |
| 4,041,412 A * | 8/1977 | Malone | H03L 7/06 | 330/306 |
| 5,684,678 A * | 11/1997 | Barrett | H02M 3/3376 | 363/17 |
| 6,595,004 B1 * | 7/2003 | Ghoshal | F25B 21/00 | 62/3.1 |
| 7,816,601 B2 * | 10/2010 | Carver | H10N 15/00 | 310/306 |
| 8,538,529 B2 * | 9/2013 | James | H02N 1/006 | 363/19 |
| 8,581,469 B2 * | 11/2013 | Kriisa | H10N 10/00 | 310/306 |
| 9,559,617 B2 * | 1/2017 | Landa | H02N 11/002 | |
| 10,199,165 B2 * | 2/2019 | Carver | H01G 4/14 | |
| 10,951,136 B1 * | 3/2021 | Carver | H05B 1/0283 | |
| 11,056,265 B2 * | 7/2021 | Carver | H03B 5/08 | |
| 11,223,301 B2 * | 1/2022 | Carver | H05B 1/0283 | |
| 11,303,229 B2 * | 4/2022 | Carver | H02N 11/008 | |
| 11,671,033 B2 | 6/2023 | Carver et al. | | |
| 11,677,338 B2 | 6/2023 | Carver et al. | | |
| 2007/0175217 A1 * | 8/2007 | Fellows | H10N 15/20 | 290/1 R |
| 2007/0253224 A1 * | 11/2007 | Cohen | H02M 1/4216 | 363/9 |
| 2009/0133409 A1 * | 5/2009 | Chen | H01L 23/473 | 62/3.6 |
| 2011/0148248 A1 * | 6/2011 | Landa | H01J 45/00 | 310/306 |
| 2011/0242855 A1 * | 10/2011 | Jovcic | H02M 3/07 | 363/17 |
| 2012/0086533 A1 * | 4/2012 | Wei | H01F 30/14 | 29/606 |
| 2013/0207763 A1 * | 8/2013 | Wagoner | H01F 27/22 | 336/60 |
| 2014/0062635 A1 * | 3/2014 | Delanoe | H01F 27/245 | 336/61 |
| 2015/0262762 A1 * | 9/2015 | Ikenuma | H01M 4/0471 | 429/232 |
| 2015/0267944 A1 * | 9/2015 | Duwel | H01F 1/015 | 62/3.1 |
| 2016/0128141 A1 * | 5/2016 | Makosinski | F21L 13/00 | 315/294 |
| 2019/0103538 A1 * | 4/2019 | Carver | H02M 3/00 | |
| 2021/0058012 A1 * | 2/2021 | Carver | H05B 1/0283 | |
| 2021/0167700 A1 * | 6/2021 | Carver | H02N 11/008 | |
| 2021/0242811 A1 * | 8/2021 | Carver | H02N 3/00 | |
| 2021/0305916 A1 * | 9/2021 | Carver | H02N 3/00 | |
| 2022/0190747 A1 * | 6/2022 | Carver | H02N 11/008 | |
| 2022/0209688 A1 * | 6/2022 | Carver | H02N 11/008 | |
| 2023/0053420 A1 * | 2/2023 | Carver | H02M 11/00 | |

FOREIGN PATENT DOCUMENTS

| | | |
|---|---|---|
| JP | 2010-530204 A | 9/2010 |
| JP | 2013-527308 A | 6/2013 |

* cited by examiner

COOLING MODULE USING ELECTRICAL PULSES

CROSS REFERENCE TO RELATED APPLICATION

This is a continuation-in-part of U.S. patent application Ser. No. 17/697,808, filed Mar. 17, 2022, which is a continuation of U.S. patent application Ser. No. 17/238,643, filed on Apr. 23, 2021, now U.S. Pat. No. 11,303,229, which is a continuation-in-part of U.S. patent application Ser. No. 17/175,248, filed Feb. 12, 2021, now U.S. Pat. No. 11,223,301, which application is a continuation of U.S. patent application Ser. No. 16/997,557, filed on Aug. 19, 2020, now U.S. Pat. No. 10,951,136, which application claims priority from U.S. Provisional Application No. 62/889,506, filed Aug. 20, 2019. In addition, this application claims priority from U.S. Provisional Application No. 63/015,319, filed Apr. 24, 2020. All applications are incorporated herein by reference in their entirety.

BACKGROUND

Generation of electrical energy is a fundamental technique for our society's energy needs. Conversion of the thermal energy contained in a plasma flame, such as a cylinder in an internal combustion engine, is an example of the utilization of thermal energy to provide for its conversion into mechanical energy. If thermal energy is available, a complicated and expensive device, such as a Carnot engine or Stirling cycle engine, is used to convert the heat energy from a hot sink and a cold sink into mechanical energy. The limitations to such devices are the temperature differentials between the two heat sources must be substantial. Efficiencies in the range of 15 to 30% are typical for the larger engines. Small temperature differences, such as a few degrees Celsius, are of little practical value. Other methods such as direct thermoelectric conversion using devices, such as a thermocouple, suffer the same lack of practical utility when the temperature differences are small. A convenient and direct method for the conversion of thermal energy to electrical energy is a much needed and desirable method for generating electrical power.

DETAILED DESCRIPTION

A method and system are disclosed for the generation of electrical energy for use in numerous applications. The method is general in its applications and can be applied to many electrically powered devices, such as portable tools, sensors, optical devices, lighting, heating, cooling, breathing apparatus, medical devices, timing devices, portable computers, cell phones, powered cooling or heating devices as well as other similar and larger stationary applications where a convenient and powerful supply of electrical energy is needed. The need for such a device and method is well documented. More specifically, there is a need to have a more general and better converter of mechanical, electrical, solar, electromagnetic, and other energies from one form to electrical energy. A converter that has better input tolerance to different energy forms, if it be DC, AC, heat, EM radiation, or other sources of energy with variable frequencies, periods, and intensities, with the capabilities to be able to output different voltages, waveforms, and currents to the application loads they are connected and having the commonality of a single simple electrical output, is very much needed. Additionally, the converter should work with very low temperature differences between the ambient temperature and the heat source. As such it should be termed a "waste heat converter".

A product of the devices described herein is electrical energy. The electrical energy formed can be moved in a facile manner to other areas outside of the defined areas and volumes desired to be cooled. Because of this facile and uniquely fast method for the movement of the converted energy, this process is a desirable way to make a "heat collector", from the standpoint of compact design and reliability. The process produces a "heat collector" cold sink as a by-product of its electrical production, and there are multiple applications of this cold sink to everyday processes.

The Carver Voltaic Effect (CVE) is a kinetic physical effect that can be used to provide significant electrical power. The CVE can be described as the minute transient increase in the power of a single power transmission transient in electrical conductors or in energy transfers in materials through space. The term "kinetic" is used to describe the transitory nature of the effect. It can be detected during transitory events, such as fast voltage changes and some other phase and state changes in materials. Embodiments of the devices described herein are constructed to take advantage of this phenomena (i.e., the CVE) by the conversion of thermal energy to electrical energy. The magnitude of the CVE is associated with large dV/dt values (changes in voltage with respect to time).

Understanding the operation and manufacture of the device includes the recognition of the presence of an etalon in the output circuit and methods for the implementation and manufacture of the etalon are disclosed.

Figure 1:
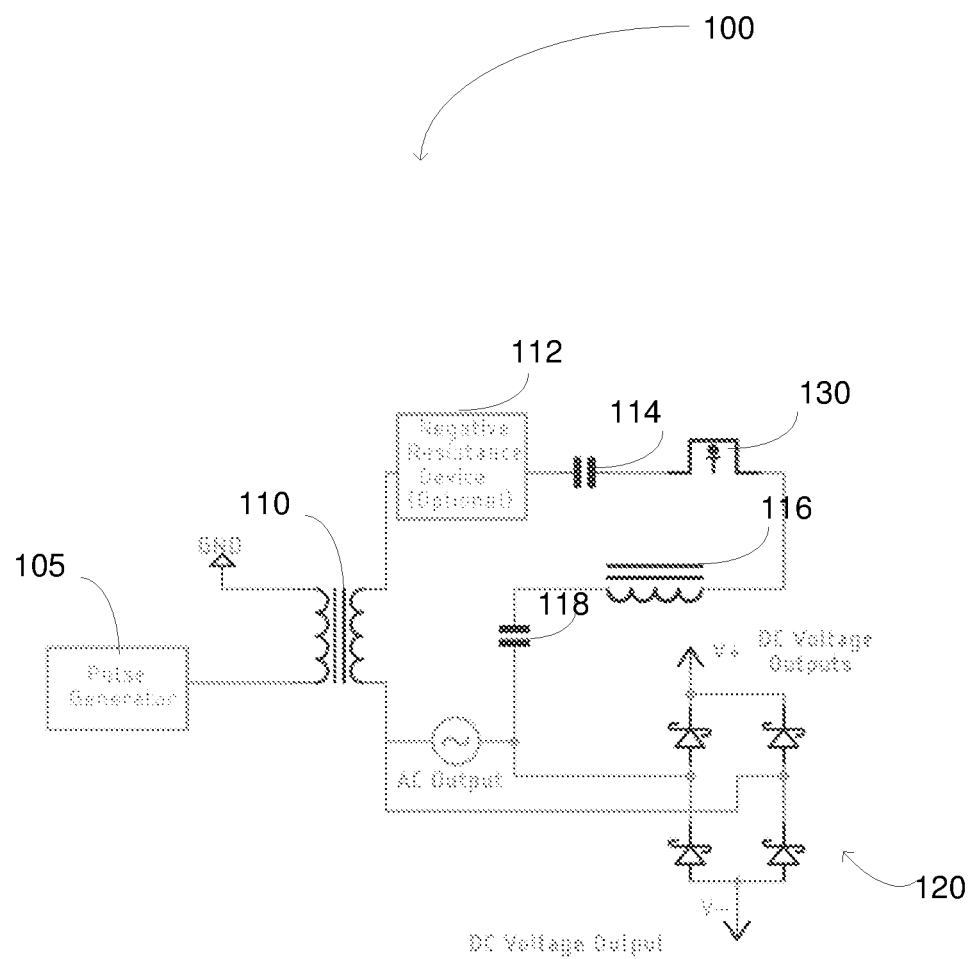
FIG. 1 is an example Carver Voltaic Effect (CVE) circuit used for generating electrical energy.

FIG. 1 is a CVE circuit 100 for converting thermal energy into electrical energy. A square wave generator 105 generates a square wave pulse train (continuous pulses) that enters a primary side of a coupled inductor 110. The coupled inductor's secondary side is connected to a nonlinear resistive device, or as is sometimes called, a negative resistance device 112, such as a thyristor. The negative resistance is optional and not used in many cases. The negative resistance device 112 serves as a device to limit the current from the secondary side to a certain value determined by its internal construction based upon the input voltage. It will not conduct meaningful current until the voltage exceeds a certain amount in the positive direction and will not conduct in the negative voltage range until the voltage is more negative than a certain amount. For example, the two voltages may be +25V and −25V. Because of this voltage characteristic, the output of the secondary side of the coupled inductor is always certain to exceed +25V and −25 Volts provided sufficient power is available to overcome parasitic losses.

The negative resistance device can be any device that can provide this type of action. Example devices include, but are not limited to, the following:
1. Gas discharge lamps
2. Spark gaps
3. Zener diodes
4. Thyristors
5. Triacs
6. Gunn diodes
7. Diodes (all kinds)
8. Silicon controlled rectifiers (SCR)
9. Switching devices controlled by a logic circuit As the driving electronics for the transformer (or coupled inductor) cause the output of the secondary to swing from positive to negative, very fast transitions from the >25V to more negative than −25V will take place. These high dV/dt transients are then utilized to produce fast voltage swings desired for the CVE to be utilized. Thus, the larger the dV/dt (higher voltage, less time), the more pronounced the CVE. The square wave in combination with the negative resistance device 112 help to achieve this goal. In this example, the capacitor C1 114 and the inductor 116 form an oscillatory circuit that further amplifies the effects of the current with its voltage swings to produce a useful output at C2 118. The C2 capacitor 118 is in turn connected to one or more rectification diodes, shown generally at 120 to produce both a positive and negative voltage output, V+ and V−, respectively. The oscillatory circuit formed by the capacitor 114 and inductor 116 can generate a signal oscillating at a frequency greater than the frequency of the square wave input signal.

A thermal exchanger 130 provides a thermal conduction path for the materials to have a continual influx of thermal energy for conversion to electrical energy. The thermal exchanger can be any device used to receive heat into the circuit. In one example, a tube (e.g., a conductive tube or non-conductive tube) is used that is filled with material having a desired permittivity and permeability. Potential materials include air, water, methanol, ethanol, and acetamide (or a solution in liquids such as water or ethanol). Ferrite slurries can also be used. The material can be pumped or circulated through the tube using an external pump, not shown. Alternatively, the solid materials can be immobilized within the resonant cavity. Subsequently liquids can be pumped through the tube to provide heat exchange to the materials and the tube itself. The tube can be any desired length. For example, the tube can be 1 ft to 5 ft in length. The tube can be any desired shape in cross-section such as round, square, rectangular, elliptical, a flat-sided oval, or a custom shape. Any geometric shape can be used (e.g., an N-sided polygon or a folded shape). Whatever the cross-section, the tube can be elongated with a cavity therein through which fluid can pass. The tube can be an etalon as described herein. The tube can be made of conductive material and can be a solid conductor.

Figure 2:
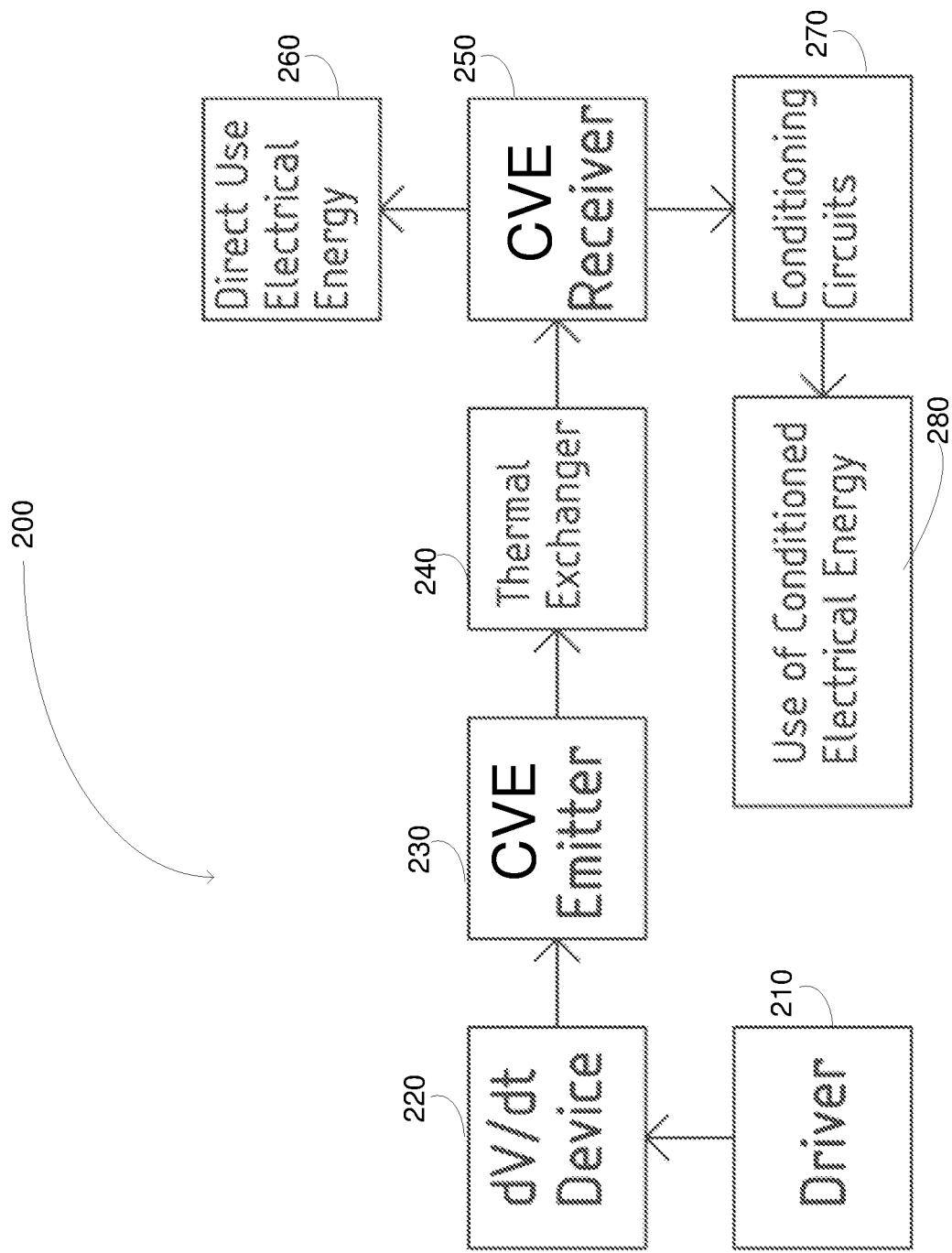
FIG. 2 illustrates a generic embodiment for a circuit for generating electrical energy using the CVE circuit of FIG. 1.

FIG. 2 shows a generic version of the circuit 200. An optional driver 210 can be a continuous pulse generator that supplies a continuous stream of pulses with high dV/dt. This provides the starting impulse to the device. It can serve as the on/off switch to run the device and it can help control the frequency at which the device is operated.

A dV/dt device 220 is shown. FIG. 1 showed the dV/dt device as a transformer or a coupled inductor 110 to indicate at least one way of generating a high dV/dt pulse or series of pulses. Alternatives to this could be a capacitor or capacitor array, a mechanical switch, or other spinning or rotation devices that bring an electrical (charge) or magnetic field (magnet) in proximity to another coil, capacitor, inductor, or another magnet or magnetic field. The CVE device may have one or more significant active devices incorporated within it. Examples are the negative resistance devices, such as a thyristor or Zener diode.

The CVE emitter 230 is shown coupled to a thermal exchanger 240. The thermal exchanger can, in turn, be coupled to a CVE receiver 250. The rapid formation of a dV/dt charge on the emitter 230 leads to the production of a "wave" of energy from the emitter. In this antenna-like mode, the emitter may be in contact with a material other than a vacuum or air. The material may have the properties of having a different dielectric constant or magnetic permeability characterized by its relative permittivity or permeability. It may also be in contact with a conductive material. The emitter 230 and receiver 250 can be a wide variety of materials (e.g., copper, brass, bronze, stainless steel, graphene) that create impedance changes at the ends of the etalon chamber. Indeed, anything can be used, so long as it changes the permittivity, permeability, or both with respect to the material between the emitter and receiver. Thus, the emitter 230 couples the circuit to the thermal exchanger 240 (which can be an etalon) and transmits a signal to the thermal exchanger. The receiver 250 receives the signal once it passes through the thermal exchanger.

The thermal exchanger 240 is shown as being between the CVE emitter and the CVE receiver. It may, in fact, be surrounding the emitter and the receiver. For example, where the thermal exchanger is a tube (e.g., an etalon) having a cavity therein, the emitter 230 and receiver 250 can be mounted in respective ends of the tube. The thermal exchanger provides the needed thermal conduction path for the materials to have a continual influx of thermal energy for conversion to electrical energy. The materials may also be electrically conductive. The thermal exchanger can be any device used to inject heat into the circuit. In one example, a tube (e.g., a conductive tube or non-conductive tube) is used that is filled with material having a desired permittivity and permeability. Potential materials include air, water, methanol, ethanol, and acetamide (or a solution in liquids such as water or ethanol). Ferrite slurries can also be used. The material can be pumped or circulated through the thermal exchanger using an external pump, not shown. Alternatively, the solid materials can be immobilized within the resonant cavity. Subsequently liquids can be pumped through the cavity to provide heat exchange to the materials and the cavity itself. Thus, the material can have a dual purpose of acting as a medium between the CVE emitter and CVE receiver and acting as a thermal exchanger having an external source that is circulated through the thermal exchanger. Electronic waves can be transmitted between the CVE emitter and CVE receiver and the permittivity and permeability of the materials contained therein can impact the resonant frequency.

The CVE receiver 250 is shown coupled to the thermal exchanger. It may or may not be in contact (e.g., air gapped or spaced) with the thermal exchanger 240. The receiver 250, by electrical induction from the wave, electrical contact with the thermal exchanger, or by electrical contact with the emitter 230 has the increased energy provided by the CVE. The receiver harvests the converted heat into an electrical conduction path to either be utilized directly by a load 260 or to be conditioned by a conditioning circuit 270. The load 260 can be any desired load and can have a resistive component (e.g., a light bulb). The conditioning circuit 270 are shown connected to the CVE receiver 250. This circuit 270 is typically a circuit to convert the AC signal (or pulsed DC) into another frequency range or convert to a DC voltage or voltages. An example conditioning circuit can be a full bridge rectifier and capacitor.

An electrical load 280 receives an output of the conditioning circuits 270. The load may be anything that uses electrical energy. It is similar to the direct use of the electrical energy load 260 but it may require conditioning from module 270. Module 260 is the direct use of the output of the CVE receiver 250. This output has typical AC signal characteristics. Resistive loads would be acceptable for this type of electrical characteristic as either square or sinusoidal waves.

Figure 3:
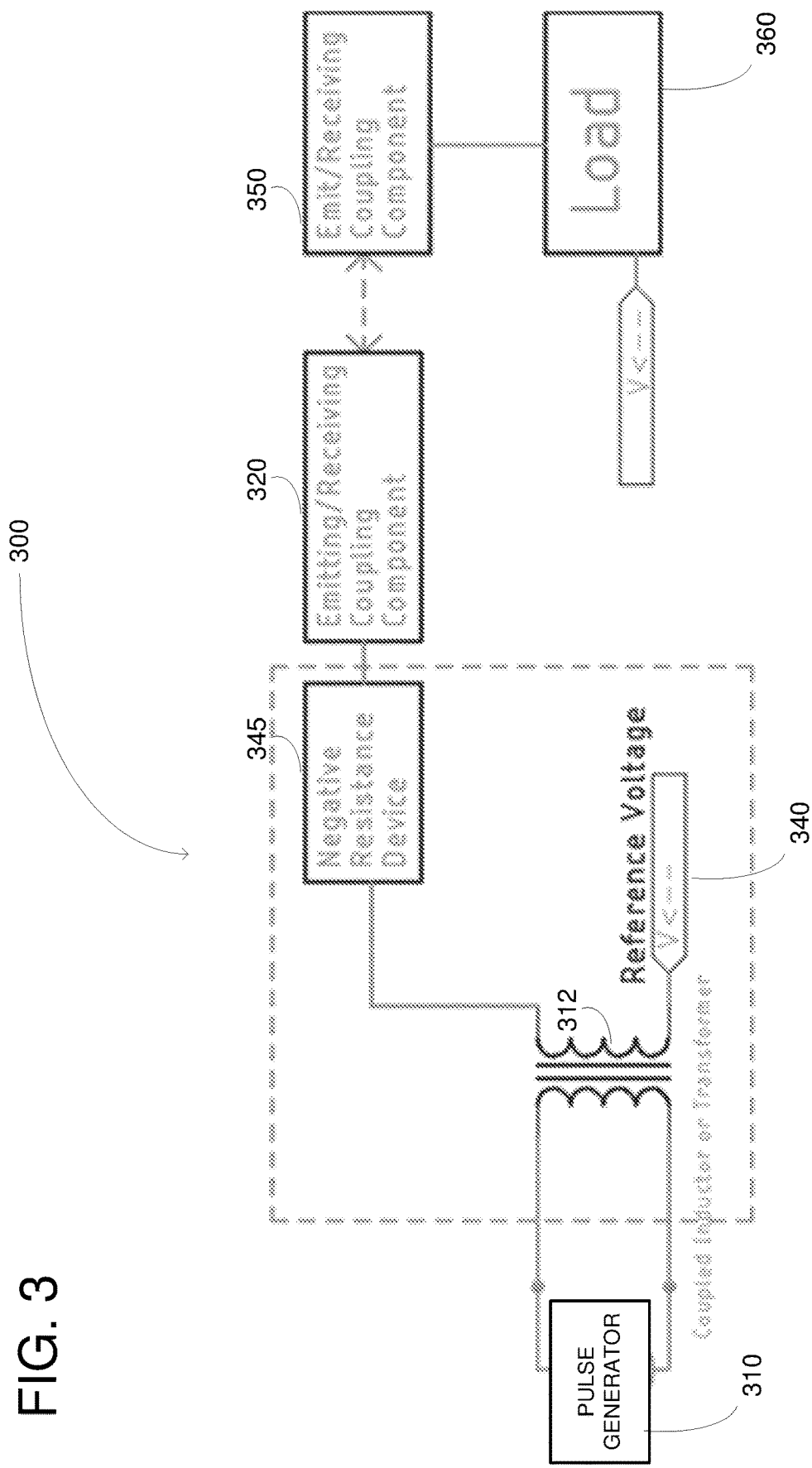
FIG. 3 shows another embodiment of a CVE circuit for generating electrical energy.

FIG. 3 is a circuit 300 in which the negative resistance device 345 is used in conjunction with the emission of the dV/dt wave as shown by connection to component 320. As previously stated, the negative resistance device is optional. A pulse generator 310 is coupled to an inductor or transformer 312. The output of the secondary of the coupled inductor or transformer 312 is referenced to a voltage indicated by V 340. The negative resistance device 345 is coupled to the inductor. The emission of the wave from component 320 can be coupled to the receiving component 350. The receiving component 350 can also be connected to a load 360. The connection between the receiving component 320 and the receiving component 350 is shown by a dashed bidirectional arrow and can be a vacuum, air, or other dielectric materials either homogeneous or heterogenous. Conductive materials can also be used.

Figure 4:
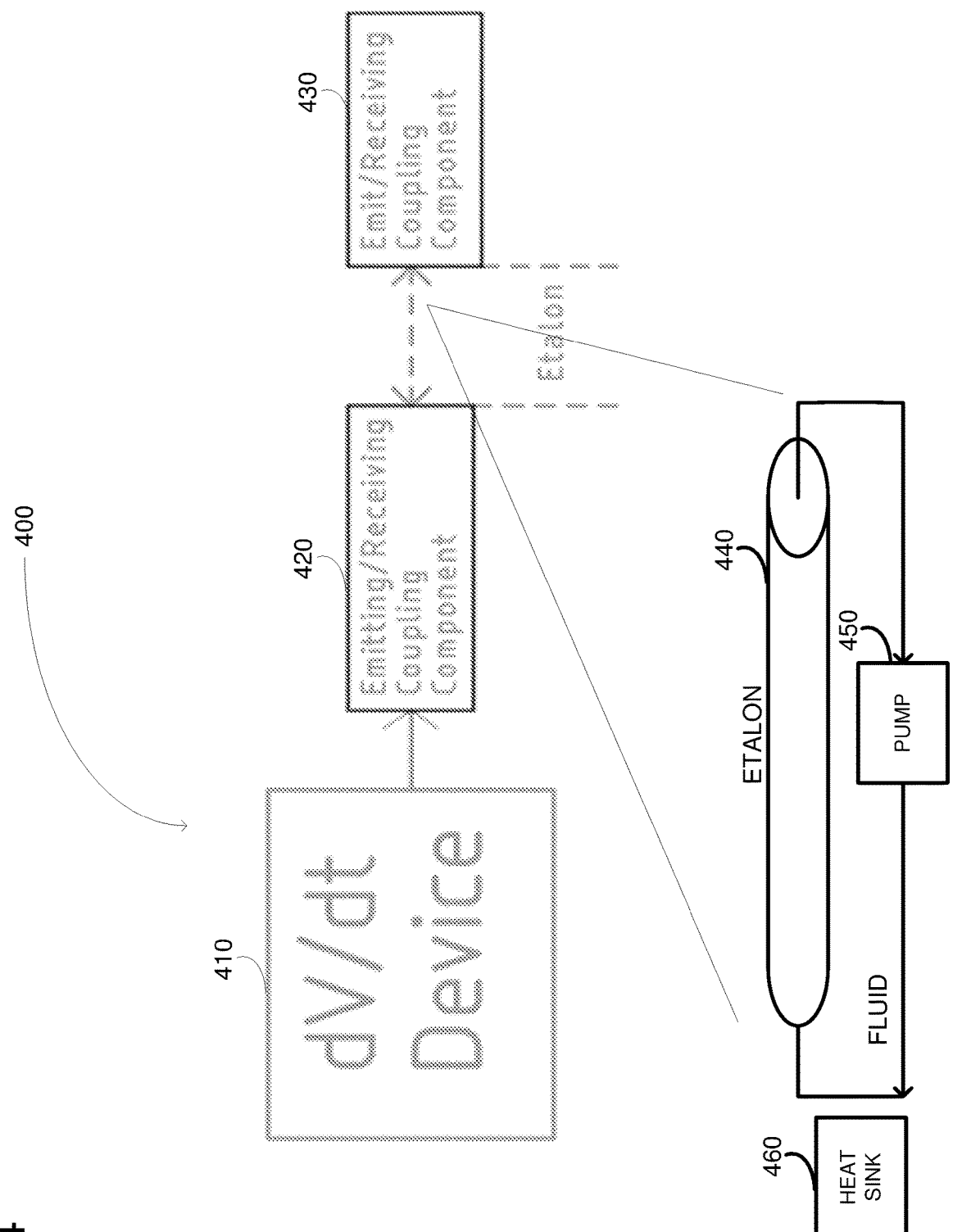
FIG. 4 shows an example etalon having fluid being pumped through a cavity therein.

FIG. 4 is a circuit 400 using an etalon for amplification. The dV/dT device 410 can be any pulse generator. Alternatively, as shown above, the dV/dT device can be a transformer coupled to a negative resistance device, as is shown in FIG. 3. The combination of elements 420, 430 comprise a resonance cavity similar to an etalon or Fabry-Perot interferometer. It can be similar to the description of the thermal exchanger 130. It is shown without a load. It may be utilized without an attached load by either emission of electrically induced waves or by simply being a higher voltage source reference for reference applications. With a load (e.g. resistive), the etalon can produce amplified power from the dV/dt device by capturing the thermal energy between the emitter and the receiver and the coupling component itself, particularly but not exclusively, when resonance occurs.

Activation frequencies can be used that are much lower than optical frequencies. In most cases, the lowest fundamental wavelength in the resonance cavity is very long compared to the relative sizes of the other components. In order to reduce the size of the resonance cavity, higher relative permittivity or permeability materials can be used to significantly reduce the length of the etalon involved. This area of the device is shown by the dotted double-headed arrow between components 420 and 430.

In the case of a high permittivity capacitors, relative permittivity in the ranges of 3 to ≥20,000 are not uncommon. Higher permittivity materials are known. These materials provide for a highly decreased etalon length by similar factors such as the square root of the inverse of the relative permittivity multiplied by the relative permeability.

An etalon 440 is shown between the components 420, 430. The etalon (wave resonant cavity) chamber can be considered as one (or more) of the oscillator components. This particular etalon differs from a purely electrical conductivity element by involving emitted electrical waves rather than electrical current oscillation in a conductor. A hollow etalon also provides the ability to fill the resonance cavity with a material that has a permittivity (and/or a magnetic permeability) that is greater than vacuum or air. This increased permittivity/permeability decreases the fundamental oscillation length. Folding (or coiling) the length helps reduce the overall size. The etalon cavity may be where most of the heat conversion to electrical energy will take place. Fluid can be moved through the etalon's cavity. The fluid will be constantly cooled by the resonance of the dV/dt waves while the movement of the etalon fluid provides a way to effectively get heat into the resonance volume by carrying the heat from an external source. Or, simple heat conduction/convection into the resonance cavity volume can be used to provide the heat from an external heat source, possibly using a second fluid (e.g. water) or heat pipe.

The etalon 440 is shown as a cylindrical tube, in this embodiment, with a cavity extending therethrough. A pump 450 is used to pump fluid through the etalon 440. A heat sink 460 is used to extract heat from the ambient environment and pass the heat to the fluid. The etalon can then convert the heat to electrical energy. The etalon can be filled with materials that have different permittivities and permeabilities, such as air, water, methanol, ethanol, and acetamide (e.g. in a solution of water or ethanol). Higher permittivity materials allow a lower drive frequency to be used and still be at resonance. The etalon can have a dual purpose of acting as an electrical coupling between the component 420 and the component 430 and also acting as a thermal exchanger.

The emitter 420 and receiver 430 can be a wide variety of materials (e.g., copper, brass, bronze, stainless steel, graphene) that create impedance changes at the ends of the etalon chamber. Different electrical elements can also be used as the emitter 420 and receiver 430, such as inductors and capacitors. Indeed, anything can be used, as long as it changes the permittivity, permeability, or both with respect to the material between the emitter and receiver. The load should be selected so as to have proper impedance matching with the source, as is well known in the laser, transmission, and antenna fields.

Figure 5:
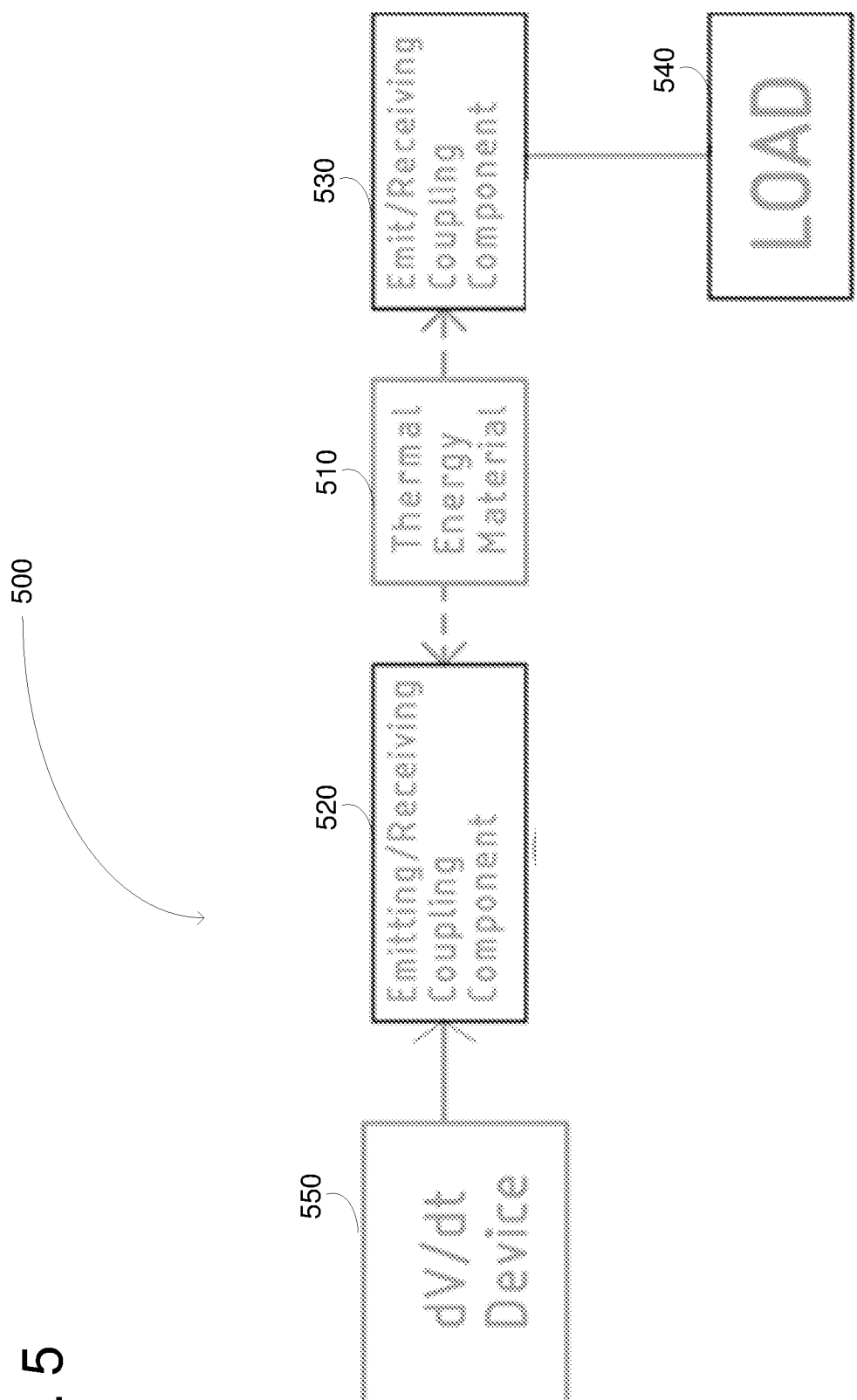
FIG. 5 is a circuit according to another embodiment for generating electrical energy.

FIG. 5 is a circuit 500 that is an additional schematic representation of the material 510 in between the etalon's reflective surfaces, 520 and 530. The thermal energy material 510 is in the transmissive path and/or reflective path of the wave coming from the emitter or the reflected wave from the receiver. Due to the CVE, the power in the wave is augmented by each traverse of the wave between the surfaces. In this way the material 510 is cooled, since the energy required for the increase in energy in the wave is obtained from the thermal energy contained in the material itself due to the law of conservation of energy.

To achieve resonance in a given cavity, the cavity's shape must be taken into account. Square or round shapes may be used as well as oval, elliptical, polygonal, and other geometrical shapes. Also, the material filling a resonance cavity plays a part in determining the frequency of resonance.

Increasing the permittivity or permeability of the material filling a given cavity changes its resonance to a lower frequency. In the case of the frequency of electrical waves, the resonant frequency of the cavity is related to the square root of the inverse of the relative permittivity multiplied by the relative permeability of the material vs a pure vacuum. Thus, higher permeability and higher permittivity materials can lead to reduced physical sizes of the etalon cavity.

Higher permittivity materials (Thermal Energy Material) may be used to provide an etalon cavity that is substantially shorter (thereby smaller) than that with vacuum or air-filled cavity. Additionally, the material 510 may be thermally conductive to facilitate thermal transfer into the cavity from the environment or heat source. Liquid materials are attractive in that they can be circulated to facilitate heat transfer. Materials that can be used are those that are transmissive to the wave itself. Some materials (or mixtures, suspensions, or slurries thereof) that may be used but are not the limitation for use are as follows:
1. Barium titanate
2. Other Perovskite mixed metal titanates
3. Ferrite
4. Inorganic Oxides
5. Air
6. Organic alcohols
7. Organic materials that may be transmissive to the wave
8. Conductive metals
9. Semiconductive materials
10. Species of carbon (e.g. graphite, graphene, Fullerenes)
11. Materials which themselves re-resonate at other frequencies (e.g. phosphors, rhodamine) via harmonic generation
12. Water or water with dissolved salts, liquids, or other species suspended or homogeneous.

Materials can be used to partially fill or fully fill the cavity to provide a pathway for thermal conduction to the etalon cavity. The load 540 can be any desired electrical load, such as a load having a resistive component. The dV/dt device 550 is similar to those described above.

As an example of the device, the following set of components can be used.
1. Transformer (coupled inductor), 10:1 ratio, 2 A current rating, 700 uH secondary inductance
2. 0.01 uF, 1000 V ceramic capacitor
3. 254 uH ferrite single inductor, 10 A inductor
4. Copper tube (⅝" OD×½" ID×24 inches length)
5. Powdered ferrite (125 mesh)
6. Resistive load (110 Ohm, 100 W metal film resistor)
7. 2 pc Copper wire (10 AWG×1" long)
8. Zener Diode (1N5388)

Using the schematic shown in FIG. 1, the copper tube is first packed with the ferrite powder. One piece each of the copper wire is inserted into each end of the tube and used to make connection to the remainder of the circuit. The transformer is driven by means of a pulsed current source at a frequency of 1 Hz to several GigaHertz. The exact frequency required can be tuned by maximizing the ratio of power produced to the power necessary to drive the transformer's primary. The secondary of the transformer is attached to one piece of the copper wire in the copper tube. The other end of the copper tube with the remaining wire is attached to a negative resistance device such as a Zener diode. The other end of the diode is attached to an inductor. The remaining connection is led back to the secondary of the transformer's output. Electrical energy can be obtained by attachment of a capacitor to almost any portion of the above secondary circuit as a tap to the voltage produced in the resonance circuit. The remaining lead on the capacitor can optionally connect to a rectifier circuit for further conversion to an AC, pulsed DC, or smoothed DC output by conventional means.

Figure 6:
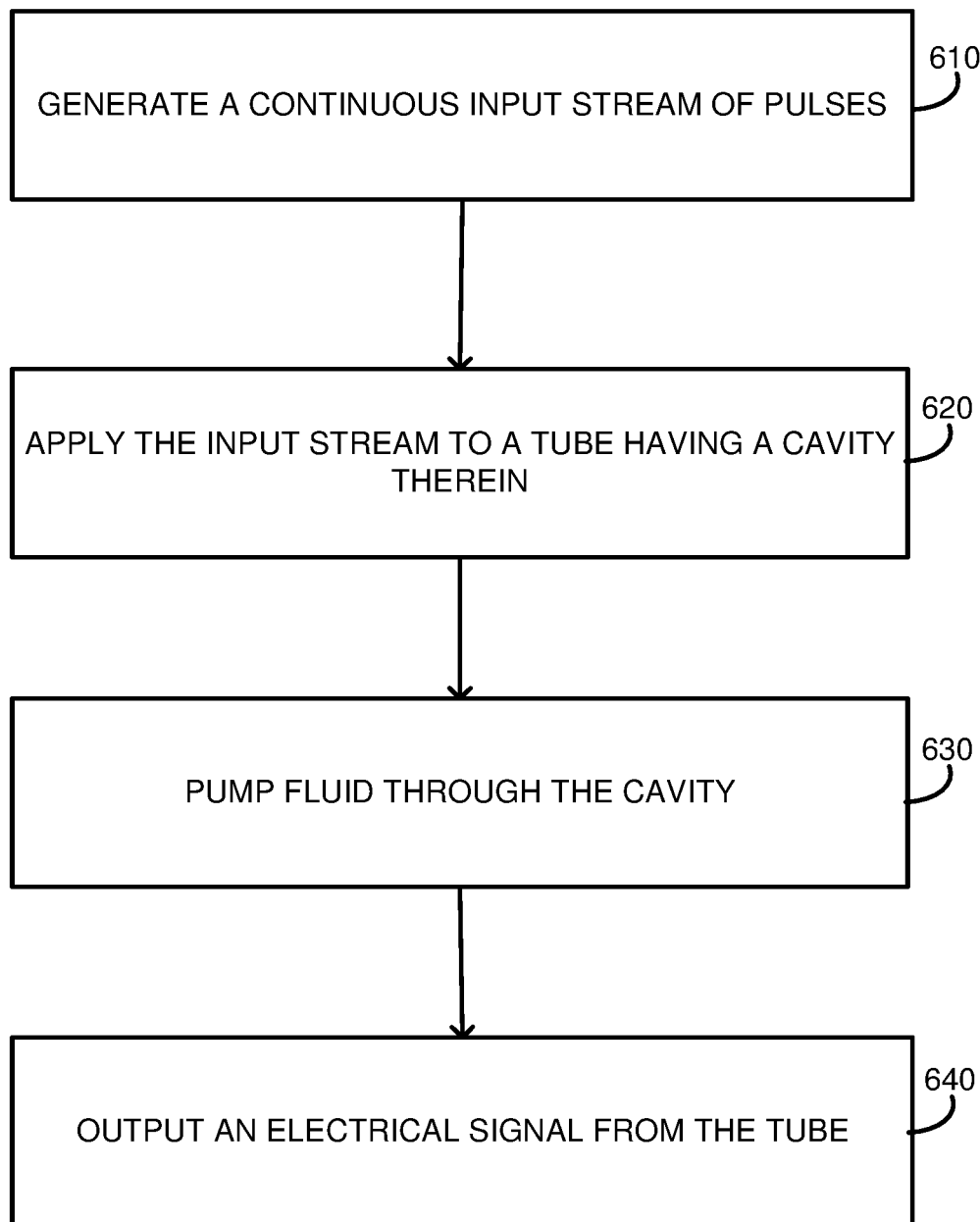
FIG. 6 is a flowchart according to another embodiment for generating electrical energy.

FIG. 6 is a flowchart for generating power according to an embodiment. In process block 610, a continuous stream of pulses is generated, such as by a pulse generator. The pulse generator can generate pulses having a dV/dt of 100V/µs or even 10,000 to 100,000 V/µs or higher. Specific use cases have used between 3 to 10V/µs. In some cases, 1V/µs can be used. In process block 620, the continuous stream of pulses is applied to a tube having a cavity extending therethrough. The tube can be conductive and have fluid continuously pumping through the cavity (process block 630). The fluid can be warmed by a heat sink or other heating element. The fluid can be cooled as it passes through the tube due to the CVE. At process block 640, an electrical signal can be output from the tube having a greater power than was output by the pulse generator due to conversion of thermal energy of the fluid to electrical energy. In some embodiments, an oscillator can be used to generate pulses at a greater frequency than the pulse generator.

Figure 7:
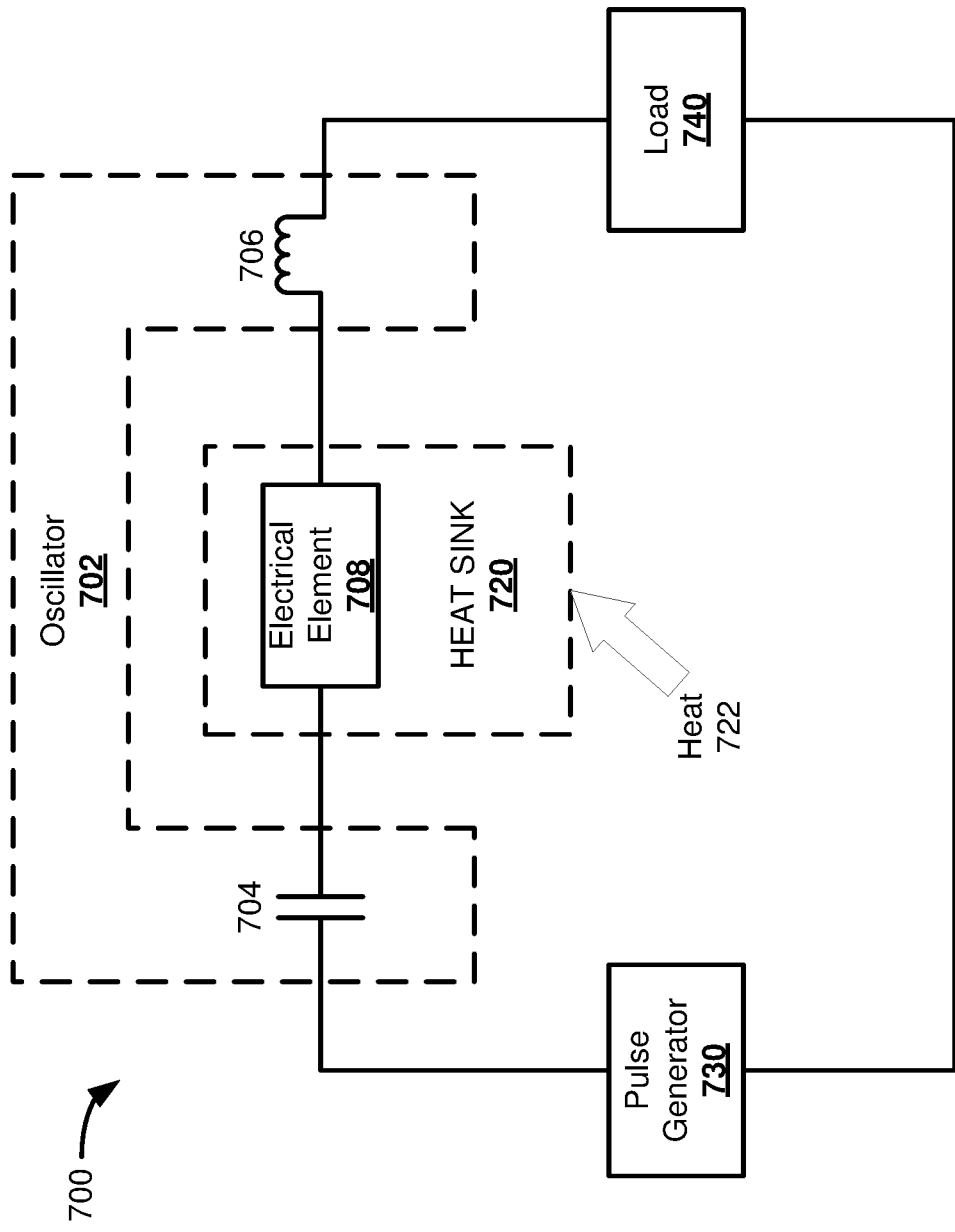
FIG. 7 is a circuit diagram according to another embodiment for generating electrical energy.

FIG. 7 shows another embodiment of a CVE circuit 700 (also called a "CVE transformer"). The circuit 700 includes an oscillator 702, which includes a capacitor 704 and an inductor 706 to form an LC or tank circuit. Although the capacitor 704 and inductor 706 are shown coupled in series on opposite sides of an electrical element 708, they can be coupled in series and positioned together on one side of the electrical element. The circuit 700 further comprises a heat sink 720, which provides additional surface area that can allow for the absorption of additional heat 722 from a heat source, or from multiple different heat sources. The heat sink 720 can be thermally coupled to the electrical element 708 so as to allow heat transfer therebetween (e.g., direct contact). The heat source can include any source which is warmer than the electrical element 708 including ambient air in which the heat sink resides. The circuit 700 can operate similar to the circuits described above, wherein a pulse generator 730 can generate either a single electrical pulse, or a series of electrical pulses having a high dV/dt ratio. The oscillator 702 can generate an oscillating signal in response to each pulse and the electrical element 708 can convert thermal energy into electrical energy by cooling off and increasing the power of the electrical pulses output by the pulse generator 730. The heat sink 720 can absorb the heat 722 to provide the electrical element 708 with a constant source of thermal energy that can be converted to electrical energy. Accordingly, the electrical power provided to a load 740 is greater than the electrical power produced by the pulse generator 730.

Further advantages that the CVE transformer are the ease of accepting practically any electrical input form (AC, DC, etc.) with virtually any frequency or mixture of frequencies. It also has the benefit of its electrical output being a consistently known AC waveform relatively easily transformed to a broad array of electrical formats. Even in the cases where the desired electrical output waveform and voltage is the same as the input, the CVE transformer can provide value in removing and "cleaning" the input waveform into a more consistent specified output. Removal of spurious AC signals, DC offsets, and other forms of unspecified contamination of the power can be obtained. In addition, the frequency range of the input waveform can be both higher and lower than that of the output without having to modify the circuit in any way to use both the high frequencies and the low frequency components of the input simultaneously. Thus, the full energy content of the input can be more readily utilized. This is especially useful for input power that has frequencies above several hundred kHz where simple rectification of the electrical signal can be very inefficient.

Applications that can benefit from the CVE transformer include, but are not limited to, suppression of electrical noise in mass electric transportation due to lighting strikes, electric energy impulses from nuclear explosions, chemical weapons, sun related phenomena, and other high energy events that may impact electronics and electrical supplies. Other applications that may need to supplement one or more of the electrical inputs along with additional energy from the conversion of other heat or energy sources to an electrical output are also good uses.

Other forms of energy beside electrical energy may be input into the "CVE transformer". The energy inputs are either heat or an energy source that can be converted to heat. Examples are kinetic energy (flywheel), acoustic, optical, electromagnetic radiation, magnetic, chemical, nuclear (atomic), and gravity potential. All of these energy sources can ultimately lead to the production of heat energy.

Figure 8:
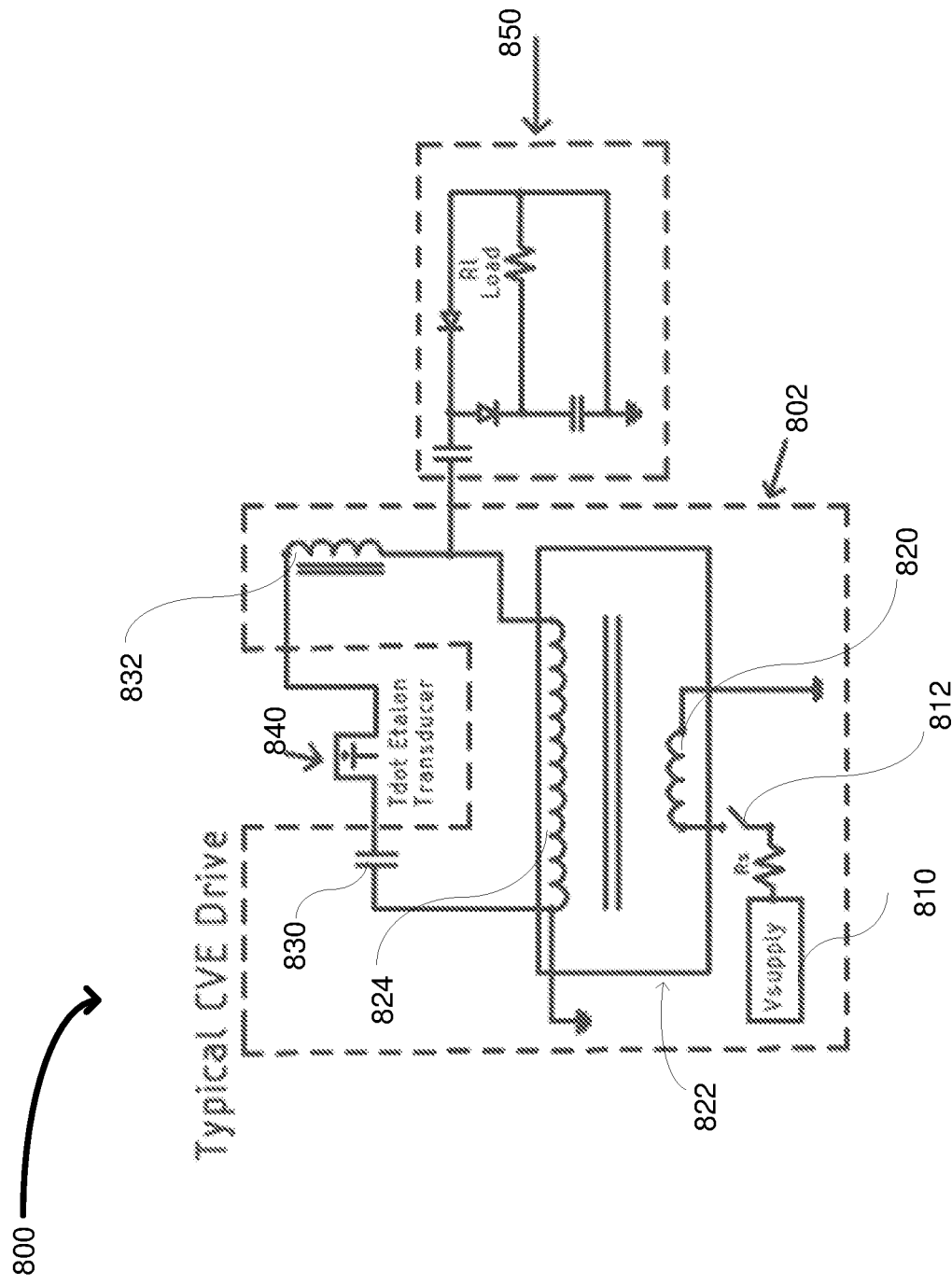
FIG. 8 is another embodiment of a CVE circuit.

FIG. 8 is another example of a CVE circuit 800 including a CVE drive 802 (shown in dashed lines) that can be used. In this example, a voltage supply 810 can be used to supply a stream of pulses in conjunction with a switch 812. The switch 812 can be controlled by a microprocessor (not shown). The switch 812 is coupled to a first winding 820 of an inductor 822. A second winding 824 of the inductor 822 is coupled to a capacitor 830 and an inductor 832 coupled in series and used as a secondary oscillator. An etalon 840 can be used as an electrical element and provides the energy transformation of heat to electrical energy using the cooling effect of the pulses generated by the voltage supply 810 and switch 812, in conjunction with the secondary oscillator formed by the capacitor 830 and the inductor 832. Due to the injection of heat into the etalon 840, increased energy can be supplied to a load circuit 850 than is supplied by the voltage supply 810.

Figure 9:
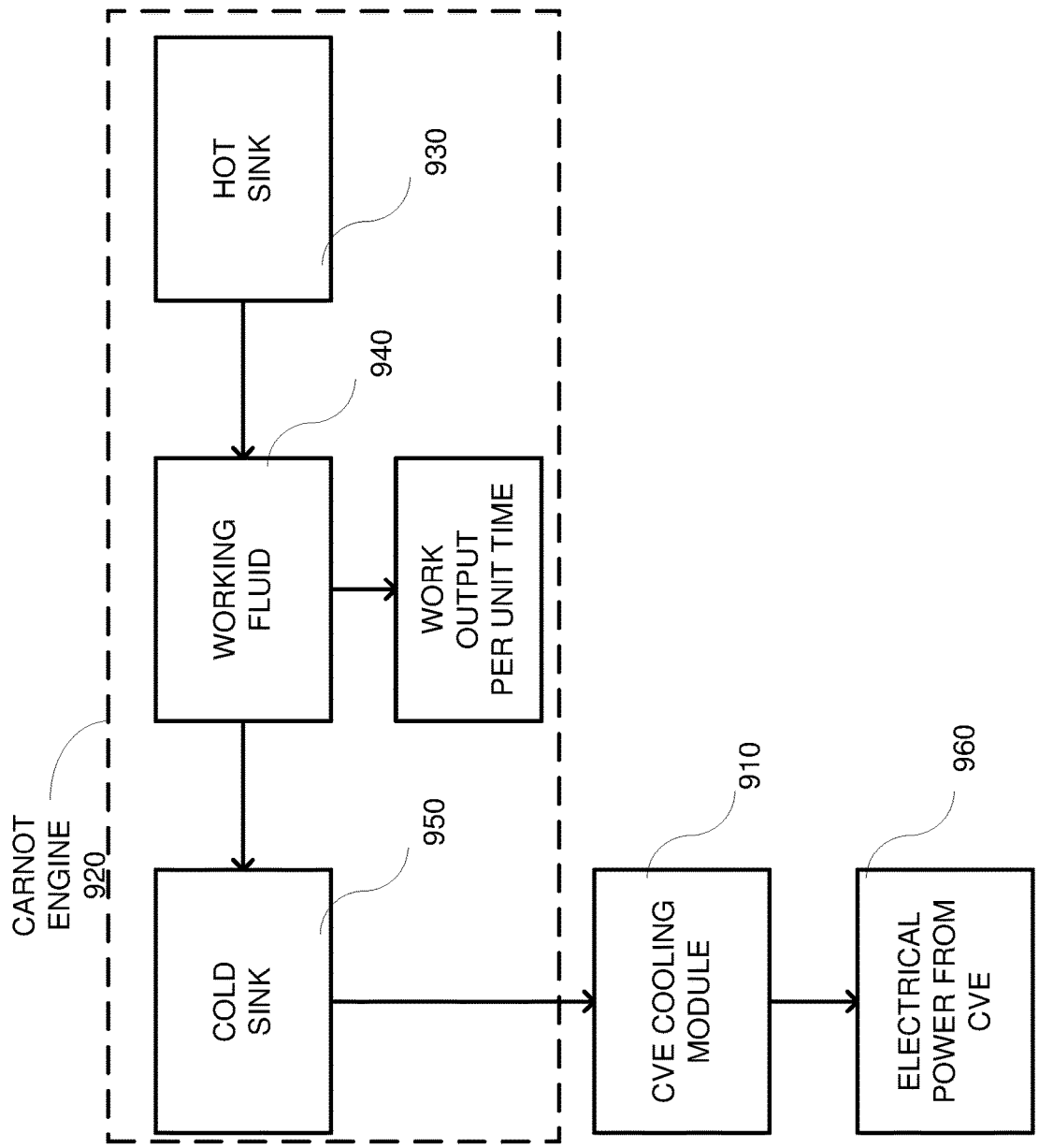
FIG. 9 is an exemplary application of the CVE circuit applied to a Carnot engine.

FIG. 9 shows the CVE drive 910 (which can be any CVE circuit described above) used in conjunction with Carnot engine 920 so that the engine performs more efficiently. The Carnot engine 920 includes a hot sink 930, which supplies energy to a working fluid 940. The working fluid performs work, which can be power or work per unit time. The working fluid discharges residual heat to a cold sink 950. The thermal source from the hot sink 930 may be anything that can be put into thermal contact with the working fluid 940 and that has a higher temperature than the working fluid. The thermal source may be a gas, liquid, or solid material, preferably in close contact with the working fluid. The maximum thermodynamic efficiency is related to the absolute temperatures of the hot sink and the cold sink and is defined by the following formula: $\eta=1-(TC/TH)$. A reduction in the temperature of the cold sink 950 improves the efficiency of the Carnot cycle engine. Thus, the CVE module 910 can be used in conjunction with the cold sink 950 to ensure that the cold sink 950 maintains or lowers its temperature by pulling any heat from the cold sink 950. The heat extracted from the cold sink 950 can, in turn, be used to produce electrical power 960 in excess of any supplied power to the CVE cooling module 910. Thus, the temperature of the cold sink 950 of the Carnot engine 920 can be lowered, heat can be supplied to the CVE device, and electrical power is produced along with the power produced by the Carnot engine. Greater efficiency is obtained by having a lower temperature cold sink, and the additional energy from the CVE device can be obtained as an additional boost to the efficiency. The electrical element of the CVE device can include a wide variety of materials including copper and other conductive materials. Graphene, graphite, and other carbon structures are known to be used as thermal conductive pathways as well as being electrically conductive materials. Electrically non-conductive materials can also be used and include water, saltwater, organic amides, glycols, alcohols, and other high permittivity materials or permeability materials such ferrite, iron, and other such ferromagnetic materials. The input frequency of the signal supplied to the electrical element can be in the frequency range of 0.1 Hz to 5 GHz. The cold sink 950 is capable of extracting heat from gases to provide cooled gases. Additionally, the cold sink 950 can extract heat from a liquid to provide a cooled liquid. Still further, the cold sink 950 can extract heat from a solid to provide a cooled solid. Any of the gas, liquid or solid can be circulated to provide continuous contact with the working fluid.

Figure 10:
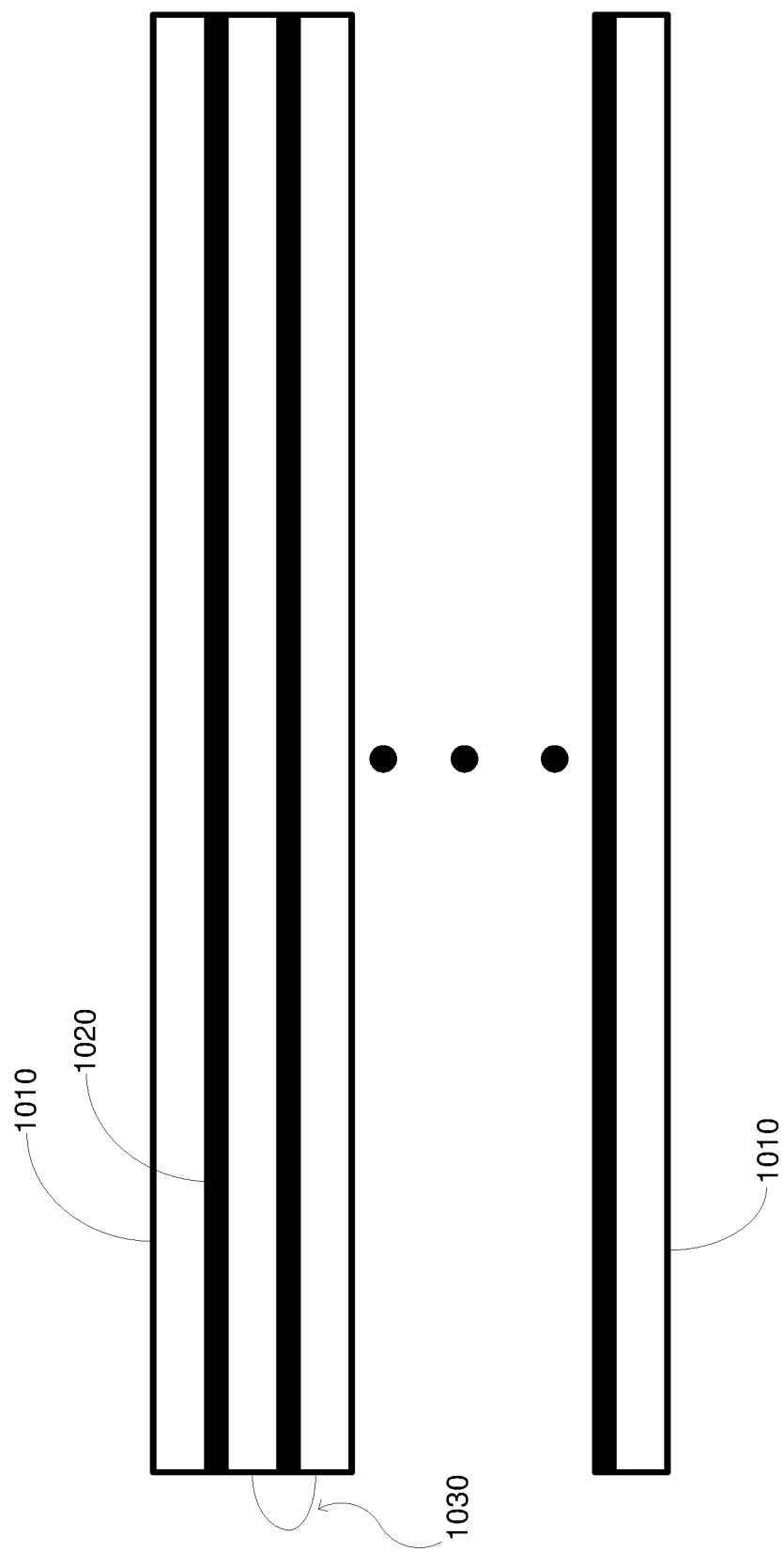
FIG. 10 is an exemplary layered heat exchanger used in the CVE circuit.

The electrical element of the CVE can also include one or more sheets 1010 of conductive material, such as is shown in FIG. 10, separated by insulators 1020. The sheets desirably have a large surface area and can be square-shaped or rectangular-shaped. The sheets 1010 are coupled together by wires or by folding a sheet to make a continuous conductive surface, such as is shown at 1030, so that the electrical pulses of the CVE can pass through the conductive sheets. Any number of sheets can be coupled together. Through the use of the layered structure, the electrical element cools efficiency. The layers 1010 utilize the "skin effect" of the materials to provide a lower resistance to the conducted current. This reduction in resistance and increase in surface area increases the overall current density for a given voltage drop across the material and provides for a higher effective thermal cooling (W/kg/K).

Figure 11:
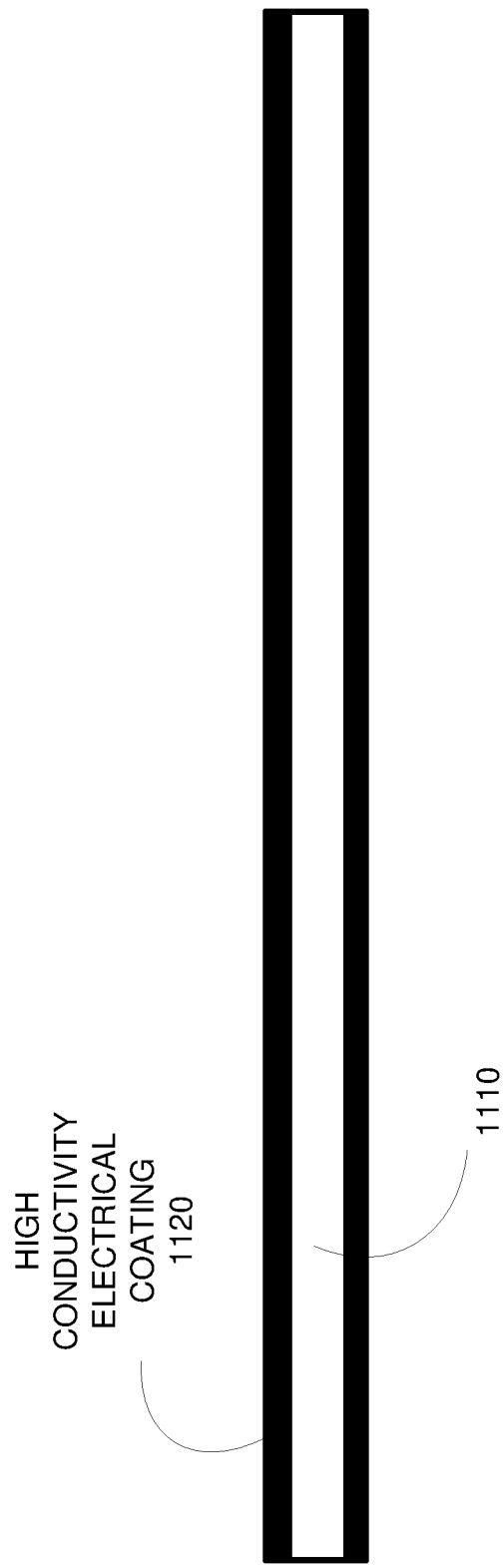
FIG. 11 is an exemplary heat exchanger having a high conductivity electrical layer.

FIG. 11 is an additional example of the electrical element 1110 of the CVE having an electrical coating 1120 on the surface thereof. For example, a silver coated conductive structure can be used to form not only the solid single layer exchanger as shown, but also the multilayer structure of FIG. 10. The enhanced conductivity of, for example, silver on a copper plate provides a greater current density in the electrical element versus being uncoated. Other highly conductive materials beside silver and copper can be used to coat less expensive or more desirable materials. The layered structure can be in electrical and physical contact from layer to layer or alternatively a thin non-conductive coating between layers can additionally serve to electrically insulate the layers from each other. In some instances, the conductive coating forms an electrically insulative layer of oxides. An example of such a material is aluminum with an anodized or oxidative treatment to provide a non-conductive coating.

Figure 12:
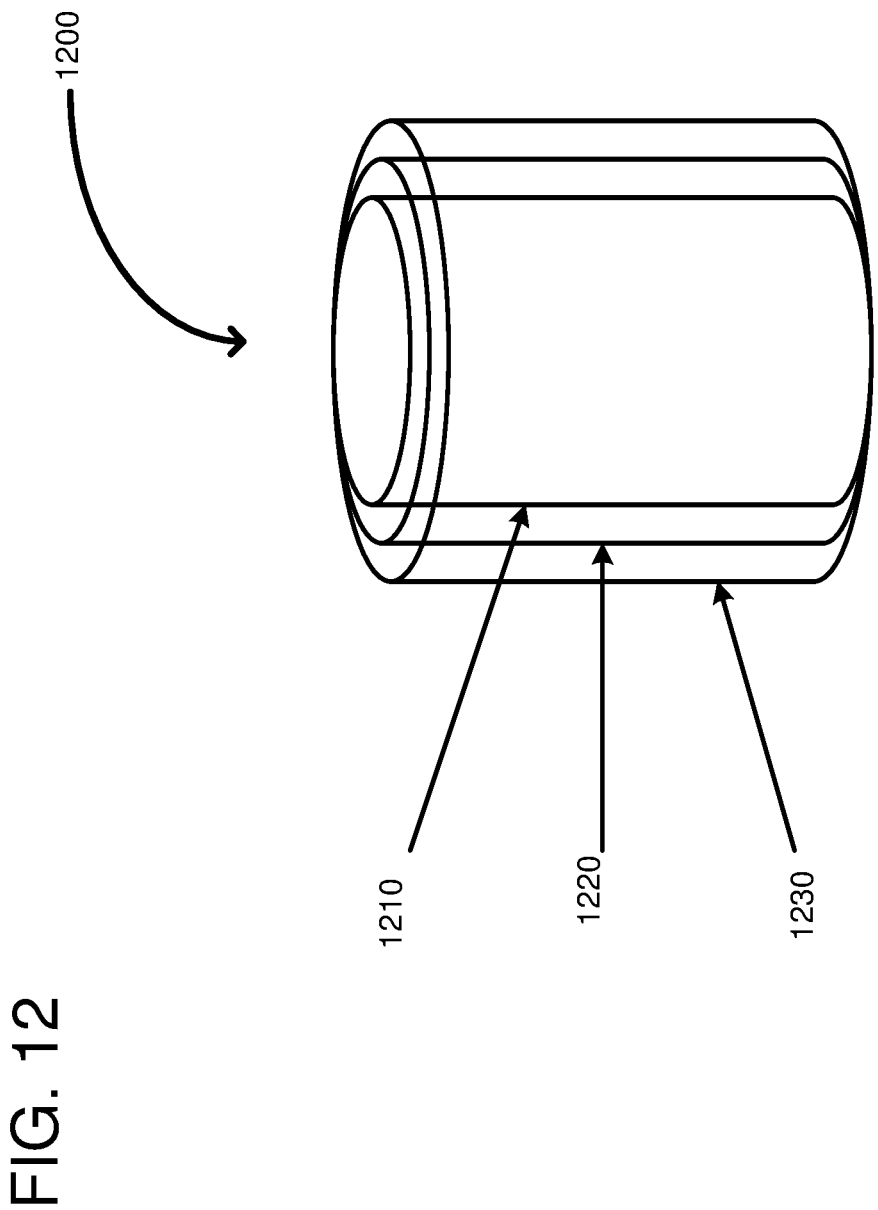
FIG. 12 is an exemplary heat exchanger including cylindrical layers.

FIG. 12 shows the electrical element of the CVE formed of concentric cylinders 1200. The tubular shape is then more conducive to a heat exchange fluid being circulated with its confines or with external circulation over its surface. A cylinder 1210 can be made of material as described above. An external coating 1220 can be applied to the outer surface of the cylinder 1210. This coating may be silver, aluminum, nickel, chromium, or other highly conductive material such as graphene or other carbon structures. Additionally, an insulative coating 1230 can be applied to the coating 1220. Alternatively, the sequence of layers can be rearranged to provide for essentially the same cylinder suitable for fluid thermal heat sources. Building sequential cylinder elements outwardly provides the same effect and can be used.

The materials of the electrical element or cold sink may also be coated with an external coating to not only provide decreased resistance but also to enhance the absorption of heat, electromagnetic waves, electric waves, and resistance to corrosion. The coatings can be used to vastly increase the absorption of electrical waves, especially in the case of nonconductive exchanger materials. This has a large effect on the cooling ability of the device per unit weight. This is due to the fact that the capability of the cooling by the CVE effect can be more effective if the temperature drop of the interface is minimized. Thus, for a small thermal drop, the rate of thermal heat transfer at the surface of the cold sink is generally the limitation for the wattage capabilities of the CVE.

Conductive coatings that may be used include, gold, silver, palladium, platinum, rhodium, nickel, and other stainless formulations. Organic polymers coatings such as Puralene® and Parylene and their derivatives, as well as sacrificial anodes, can be used to provide superior corrosion resistance. Electrolytic anodization process can be used to provide insulative and physical protections. Carbon filled polymeric coatings can be used to provide enhanced EM radiation absorption and emission. Other materials are known for the absorption of EM waves and electric fields could also be used.

Other forms of energy beside electrical energy may be input into the CVE drive. The energy inputs are either heat or an energy source that can be converted to heat. Examples are kinetic energy (flywheel), acoustic, optical, electromagnetic radiation, magnetic, chemical, nuclear (atomic), and gravity potential. All of these energy sources can ultimately lead to the production of heat energy.

Applications that can benefit from the CVE circuit include, but are not limited to, suppression of electrical noise in mass electric transportation due to lighting strikes, electric energy impulses from nuclear explosions, chemical weapons, sun related phenomena, and other high energy events that may impact electronics and electrical supplies.

Figure 13:
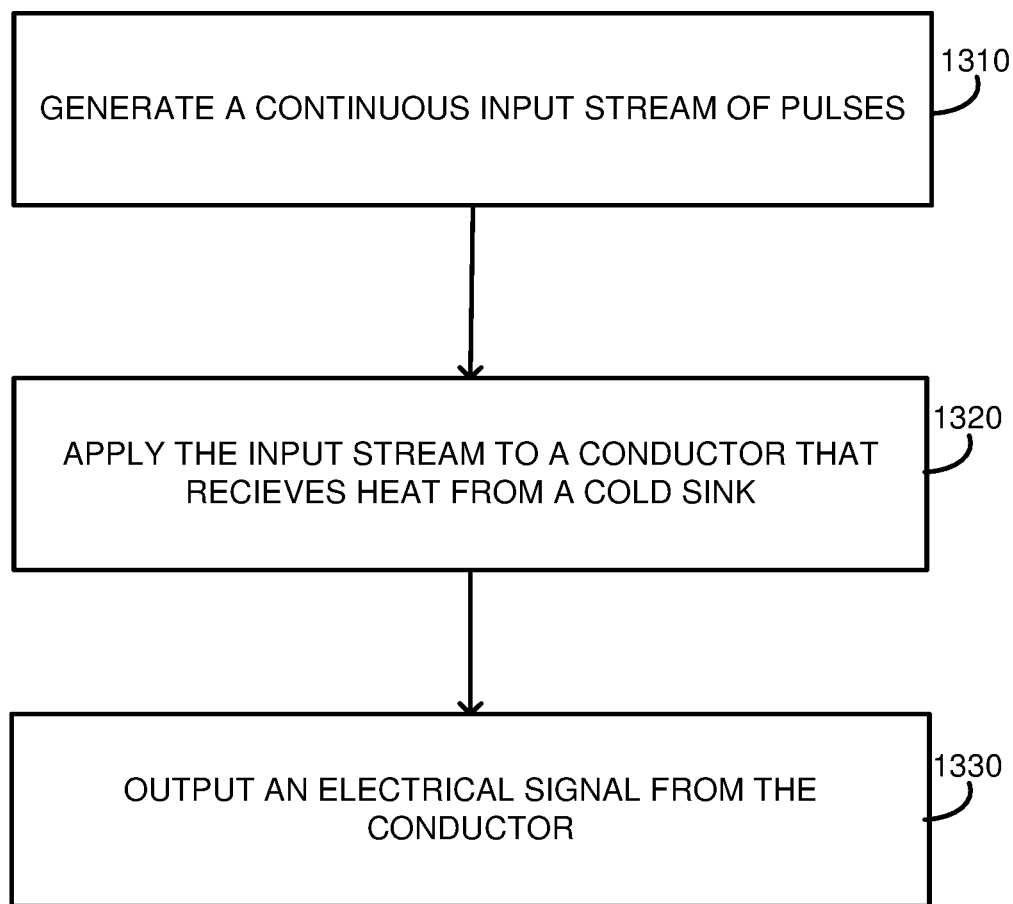
FIG. 13 is a flowchart of an embodiment for using the CVE circuit.

FIG. 13 is a flowchart of a method according to one embodiment. In process block 1310, a continuous stream of pulses is generated. For example, in FIG. 1, the pulse generator 105 can generate a stream of pulses into the inductor 110. As further examples, the pulse generator 310 of FIG. 3 or the pulse generator 730 of FIG. 7 can be used. Still further, the voltage supply 810 in conjunction with the switch 812 can be used to generate a continuous stream of pulses. In process block 1320, the continuous stream of pulses is applied to a conductor that receives heat from a cold sink. The conductor can be an etalon, as shown at 440 in FIG. 4. Alternatively, the conductor can be a wire. The cold sink can be from a Carnot engine, such as is shown in FIG. 9. In process block 1330, an electrical signal can be output from the conductor and supplied to an output load, such as load 740 in FIG. 7. The output electrical signal can be boosted by converting heat from one or more of the heat sources to electrical energy.

Figure 14:
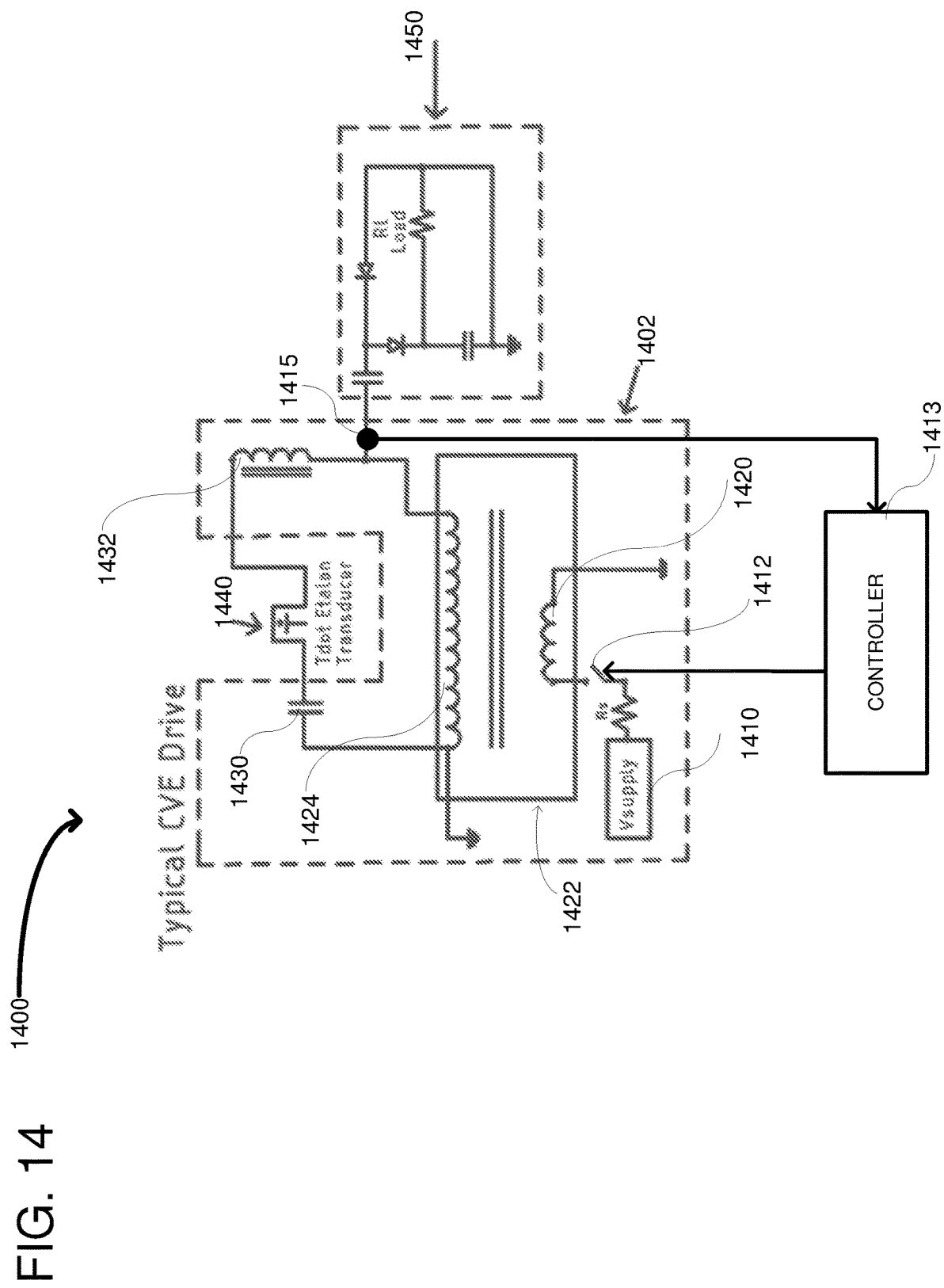
FIG. 14 is another example of a CVE circuit.

FIG. 14 is another example of a CVE circuit 1400 including a CVE drive 1402 (shown in dashed lines) that can be used. In this example, a voltage supply 1410 can be used to supply one or more pulses in conjunction with a switch 1412. The switch 1412 can be controlled by a controller 1413, which turns the switch ON and OFF in succession to establish one or more pulses. The controller 1413 can be a processor or microcontroller. Alternatively, the controller 1413 can include one or more thyristors. The switch 1412 is coupled to a first winding 1420 of an inductor 1422. A second winding 1424 of the inductor 1422 is coupled to a capacitor 1430 and an inductor 1432 coupled in series and used as a secondary oscillator. An etalon 1440 can be used as an electrical element and provides the energy transformation of heat to electrical energy using the cooling effect of the pulses generated by the voltage supply 1410 and switch 1412, in conjunction with the secondary oscillator formed by the capacitor 1430 and the inductor 1432. Due to the injection of heat into the etalon 1440, increased energy can be supplied to a load circuit 1450 than is supplied by the voltage supply 1410. An input to the controller 1413 is a voltage from node 1415, which is positioned between inductors 1424 and 1432. Examination of the voltage at node 1415 reveals an AC waveform when excitation of the etalon 1440 occurs through a pulse of energy into the primary of inductor 1422. Oscillation within the etalon 1440 takes place at a given frequency, f1, that may be greater than the oscillation frequency observed at point 1415. However, this oscillation in the etalon 1440 induces the oscillation through the elements 1430 and 1432.

The oscillation at point 1415 can be further enhanced by more pulses from the excitation switch 1412. This can increase the magnitude of the pulses driving the etalon's oscillation and also inhibit the oscillations as well. The switch 1412 is connected to the voltage supply 1410 to pulse the primary of the transformer 1422. Enhancement of the existing oscillations by timing the additional pulses of 1412 to be in phase with the existing pulse can result in greatly improved voltage levels for the oscillations. Thus, by adapting the phase and/or the frequency of the switch 1412 to match the phase and/or frequency of the voltage at node 1415, an improvement in voltage levels is achieved. The controller 1413 provides the pulse's phase timing necessary to prevent destructive interference with the existing wave and to promote constructive interference with the oscillation. In one example, thyristors acting as the controller 1413 are used and when a voltage level reaches a positive threshold (e.g., 100 V), the switch 1412 is switched and when the voltage level reaches a negative threshold (e.g., −100V), the switch is switched again.

Although node 1415 is used to obtain the phase information, other nodes can be used as well. Whatever node is used for phase information, it provides the necessary phase information for the controller 1413 to enhance the oscillation, or alternatively to provide pulses to deconstruct the oscillation. This latter case could provide a valuable means of rapidly shutting the output off in the event of excess output.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A circuit for cooling, comprising:
   a pulse generator for generating pulses;
   an etalon coupled to the pulse generator that is configured to cool in response to the pulses; and
   an output for receiving an electrical output emitted from the etalon, wherein an electrical phase of the pulse generator is adapted to match an electrical phase of the electrical output.

2. The circuit of claim 1, further including a cold sink adjacent to the etalon.

3. The circuit of claim 1, wherein the etalon is a layered heat exchanger including multiple conductive layers electrically coupled together with electrical insulators between the conductive layers.

4. The circuit of claim 1, wherein the etalon is a tube.

5. The circuit of claim 4, wherein the tube is at least partially filled with material having a predetermined permittivity or permeability larger than a vacuum.

6. The circuit of claim 4, further including a pump for pumping fluid through the tube.

7. The circuit of claim 4, wherein the etalon is a tube having a cavity therein with a semiconductor or metal at least partially filling the cavity.

8. A method for cooling, comprising:
generating one or more pulses; and
applying the one or more pulses to an etalon that extracts heat from a cold sink, wherein the one or more pulses cools the etalon, and wherein the one or more pulses are an electrical signal that is applied at a first end of the etalon, is transmitted through the etalon and is output from a second end of the etalon, opposite the first end, wherein an electrical phase of the one or more pulses is adapted to match an electrical phase of the output, which is an electrical signal output from the second end of the etalon.

9. The method of claim 8, further including transmitting the one or more pulses through a negative resistance and outputting an electrical output from the etalon.

10. The method of claim 8, wherein the etalon is a tube having a cavity therein.

11. The method of claim 8, wherein the etalon is a conductive sheet having a conductive coating thereon.

12. The method of claim 11, wherein the conductive coating is any one of the following or combinations thereof: gold, silver, palladium, platinum, rhodium, nickel, chromium, graphene, aluminum, puralene or puralene derivatives, anodized aluminum, and carbon filled polymeric residues.

13. The method of claim 8, wherein the etalon is formed of concentric cylinders.

14. An apparatus for cooling, comprising:
a pulse generator to generate electrical pulses having a first power; and
an etalon coupled to the pulse generator, the etalon for providing electrical energy to a load, wherein the etalon is configured to receive heat from a cold sink, and wherein the etalon is configured to cool in response to the electrical pulses;
wherein the etalon is configured to receive the electrical pulses, to pass the electrical pulses through the etalon and to output an electrical signal associated with the electrical pulses;
and wherein an electrical phase of the pulse generator is adapted to match an electrical phase of the electrical signal that is output.

15. The apparatus of claim 14, wherein the etalon is a tube configured to extract excess heat from the cold sink.

16. The apparatus of claim 15, further including an oscillator coupled in series with the tube, wherein the electrical pulses are at a first frequency and the oscillator generates pulses at a second frequency, greater than the first frequency.

17. The method of claim 14, wherein the etalon is a conductive sheet having a conductive coating thereon.

* * * * *